United States Patent
Asami et al.

(10) Patent No.: US 7,894,969 B2
(45) Date of Patent: Feb. 22, 2011

(54) CONTROL APPARATUS FOR VEHICLE AND METHOD OF CONTROLLING VEHICLE

(75) Inventors: Tomohiro Asami, Nisshin (JP); Toshio Sugimura, Nagoya (JP); Takaaki Tokura, Nagoya (JP); Nobufusa Kobayashi, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 772 days.

(21) Appl. No.: 11/879,502

(22) Filed: Jul. 18, 2007

(65) Prior Publication Data
US 2008/0039283 A1 Feb. 14, 2008

(30) Foreign Application Priority Data
Aug. 10, 2006 (JP) ............................. 2006-218677

(51) Int. Cl.
*B60W 10/10* (2006.01)
*B60W 10/02* (2006.01)

(52) U.S. Cl. .............................. 701/84; 701/51; 701/55; 701/56; 701/58; 701/64; 701/66; 701/85; 701/87; 701/90; 180/337; 180/338; 477/15; 477/20; 477/34; 477/43; 477/70; 477/77

(58) Field of Classification Search ....................... None
See application file for complete search history.

(56) References Cited

U.S. PATENT DOCUMENTS

| 4,685,356 | A | * | 8/1987 | Iwatsuki | ..................... 475/120 |
| 5,839,987 | A | * | 11/1998 | Sawamura et al. | .......... 477/107 |
| 5,890,994 | A | * | 4/1999 | Sawamura et al. | .......... 477/181 |
| 6,023,647 | A | * | 2/2000 | Saito et al. | ..................... 701/57 |
| 6,058,345 | A | * | 5/2000 | Kobayashi | ..................... 701/51 |
| 6,090,011 | A | * | 7/2000 | Minowa et al. | ............. 477/107 |

(Continued)

FOREIGN PATENT DOCUMENTS

JP       A 5-263911       10/1993

(Continued)

OTHER PUBLICATIONS

Japanese Patent Office, Report of Reconsideration Before Appeal for Japanese Patent Application No. 2006-218677 (with English translation), pp. 1-3 (pp. 1-2 for translation), issued Jan. 5, 2010.

(Continued)

*Primary Examiner*—Jack Keith
*Assistant Examiner*—Jonathan M Dager
(74) *Attorney, Agent, or Firm*—Oliff & Berridge, PLC

(57) ABSTRACT

A control apparatus includes a torque-boost control portion that boosts torque output from the engine, and corrects the operation amount of an adjustment mechanism that adjusts the amount of air taken into the engine to increase the amount of air during a torque phase when the automatic transmission upshifts; and an inertia-phase determination portion that determines whether an inertia phase has started. The torque-boost control portion includes a torque-boost end control portion that executes a torque-boost end control that gradually decreases a correction amount, by which the operation amount is corrected, to zero when the inertia-phase determination portion determines that the inertia phase has started.

6 Claims, 7 Drawing Sheets

U.S. PATENT DOCUMENTS

| | | | |
|---|---|---|---|
| 6,176,812 B1* | 1/2001 | Taki et al. | 477/159 |
| 6,334,833 B1* | 1/2002 | Ochi et al. | 477/143 |
| 2002/0177505 A1* | 11/2002 | Imamura et al. | 477/156 |
| 2003/0109357 A1* | 6/2003 | Tabata | 477/109 |
| 2003/0163235 A1* | 8/2003 | Tokura et al. | 701/67 |
| 2005/0101435 A1* | 5/2005 | Cowan | 477/83 |
| 2005/0192154 A1* | 9/2005 | Sakamoto et al. | 477/109 |
| 2006/0135316 A1* | 6/2006 | Fujii et al. | 477/156 |
| 2007/0032340 A1* | 2/2007 | Hrovat et al. | 477/107 |
| 2008/0200303 A1* | 8/2008 | Tabata et al. | 477/107 |

FOREIGN PATENT DOCUMENTS

| | | |
|---|---|---|
| JP | A-09-032607 | 2/1997 |
| JP | A-2000-145942 | 5/2000 |
| JP | A-2001-214771 | 8/2001 |
| JP | A-2004-316575 | 11/2004 |
| JP | A 2004-330850 | 11/2004 |

OTHER PUBLICATIONS

U.S. Appl. No. 11/879,513, filed Jul. 18, 2007 in the name of Tomohiro Asami et al.

U.S. Appl. No. 11/879,115, filed Jul. 18, 2007 in the name of Tomohiro Asami et al.

U.S. Appl. No. 11/879,507, filed Jul. 18, 2007 in the name of Tomohiro Asami et al.

* cited by examiner

FIG.3

|      | C1 | C2 | B1 | B2 | B3 | F |
|------|----|----|----|----|----|----|
| 1ST  | O  | ×  | ×  | ◎  | ×  | △ |
| 2ND  | O  | ×  | O  | ×  | ×  | × |
| 3RD  | O  | ×  | ×  | ×  | O  | × |
| 4TH  | O  | O  | ×  | ×  | ×  | × |
| 5TH  | ×  | O  | ×  | ×  | O  | × |
| 6TH  | ×  | O  | O  | ×  | ×  | × |
| R    | ×  | ×  | ×  | O  | O  | × |
| N    | ×  | ×  | ×  | ×  | ×  | × |

O ENGAGED
× DISENGAGED
◎ ENGAGED WHEN ENGINE BRAKE IS APPLIED
△ ENGAGED ONLY WHEN ENGINE DRIVES WHEELS

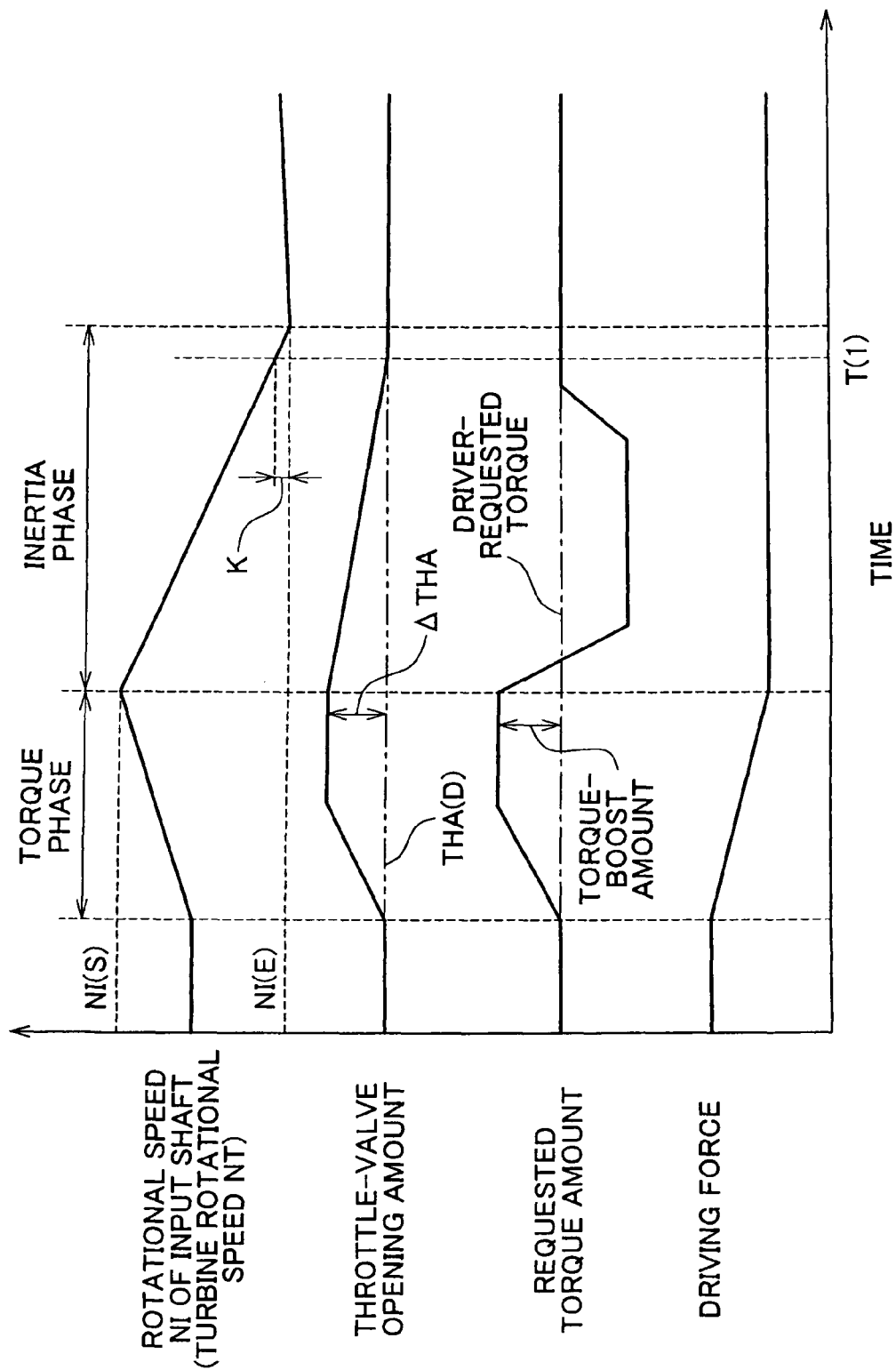

CONTROL APPARATUS FOR VEHICLE AND METHOD OF CONTROLLING VEHICLE

INCORPORATION BY REFERENCE

The disclosure of Japanese Patent Application No. 2006-218677 filed on Aug. 10, 2006, including the specification, drawings and abstract is incorporated herein by reference in its entirety.

BACKGROUND OF THE INVENTION

1. Field of the Invention

The invention relates to a control apparatus for a vehicle, and a method of controlling a vehicle. More specifically, the invention relates to a technology in which the amount of air taken into an engine is increased during a torque phase when an automatic transmission upshifts.

2. Description of the Related Art

When an automatic transmission upshifts, a driving force decreases during a torque phase, and then the driving force increases and a shock occurs when the torque phase ends and an inertia phase starts. To suppress the shock when the automatic transmission shifts, the technology in which the torque is boosted during the torque phase is proposed.

Japanese Patent Application Publication No. 5-263911 (JP-A-5-263911) describes a shift shock reduction control apparatus for an automatic transmission, in a system that includes at least one electronic control unit that electronically controls an engine and the automatic transmission. When an instruction for starting a gear shift is output, the shift shock reduction control apparatus described in the above publication starts to gradually retard an ignition timing. The shift shock reduction control apparatus advances the ignition timing to a normal timing at a given time constant after the torque phase starts, and retards the ignition timing by a given value after the inertia phase starts. When the inertia phase ends, the shift shock reduction control apparatus advances the ignition timing to the normal timing. Further, when the torque phase starts, the shift shock reduction control apparatus increases the amount of air by a given amount using an engine intake-air amount correction control portion so that the amount of fuel is automatically increased, and engine torque is increased. When the inertia phase starts, the shift shock reduction control apparatus stops increasing the amount of air. When the inertia phase ends, the shift shock reduction control apparatus increases again the amount of air by a given amount in a stepwise manner. As time elapses, the shift shock reduction control apparatus gradually decreases the amount of air.

With the shift shock reduction control apparatus described in the above publication, it is possible to minimize the possibility that the torque is decreased during the torque phase. Accordingly, it is possible to reduce the possibility that the torque is sharply increased during the inertia phase. As a result, it is possible to reduce an amount by which the torque changes at the end of the inertia phase. Thus, the control is executed to minimize the shift shock.

The shift shock reduction control apparatus described in the above publication retards the ignition timing and stops increasing the amount of air after the inertia phase starts. Therefore, the engine torque may be sharply decreased during the inertia phase. In this case, driving force is sharply decreased, and a driver feels that a vehicle is decelerated during the inertia phase. This deteriorates driveability.

SUMMARY OF THE INVENTION

A first aspect of the invention relates to a control apparatus for a vehicle that includes an engine, and an automatic transmission, connected to the engine, in which a gear is selected from among a plurality of gears with different gear ratios by selectively engaging a plurality of friction engagement elements. The control apparatus includes a torque-boost control portion, and an inertia-phase determination portion. The torque-boost control portion boosts torque output from the engine, and corrects the operation amount of an adjustment mechanism that adjusts the amount of air taken into the engine to increase the amount of air during a torque phase when the automatic transmission upshifts. The inertia-phase determination portion determines whether an inertia phase has started. The torque-boost control portion includes a torque-boost end control portion that executes a torque-boost end control that gradually decreases a correction amount, by which the operation amount is corrected, to zero when the inertia-phase determination portion determines that the inertia phase has started.

According to the first aspect, it is possible to reduce the possibility that the torque output from the engine is sharply decreased. Therefore, it is possible to reduce the possibility that a driver feels that a vehicle is decelerated during the inertia phase.

A second aspect of the invention relates to a method of controlling a vehicle that includes an engine, and an automatic transmission, connected to the engine, in which a gear is selected from among a plurality of gears with different gear ratios by selectively engaging a plurality of friction engagement elements. The method includes boosting torque output from the engine, and correcting the operation amount of an adjustment mechanism that adjusts the amount of air taken into the engine to increase the amount of air during a torque phase when the automatic transmission upshifts; determining whether an inertia phase has started; and gradually decreasing a correction amount, by which the operation amount is corrected, to zero when it is determined that the inertia phase has started.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 3 is a diagram showing an operation table for the automatic transmission;

FIG. 7 is a timing chart showing changes in a requested torque amount and a throttle-valve opening amount.

DETAILED DESCRIPTION OF THE EXAMPLE EMBODIMENTS

Figure 1:
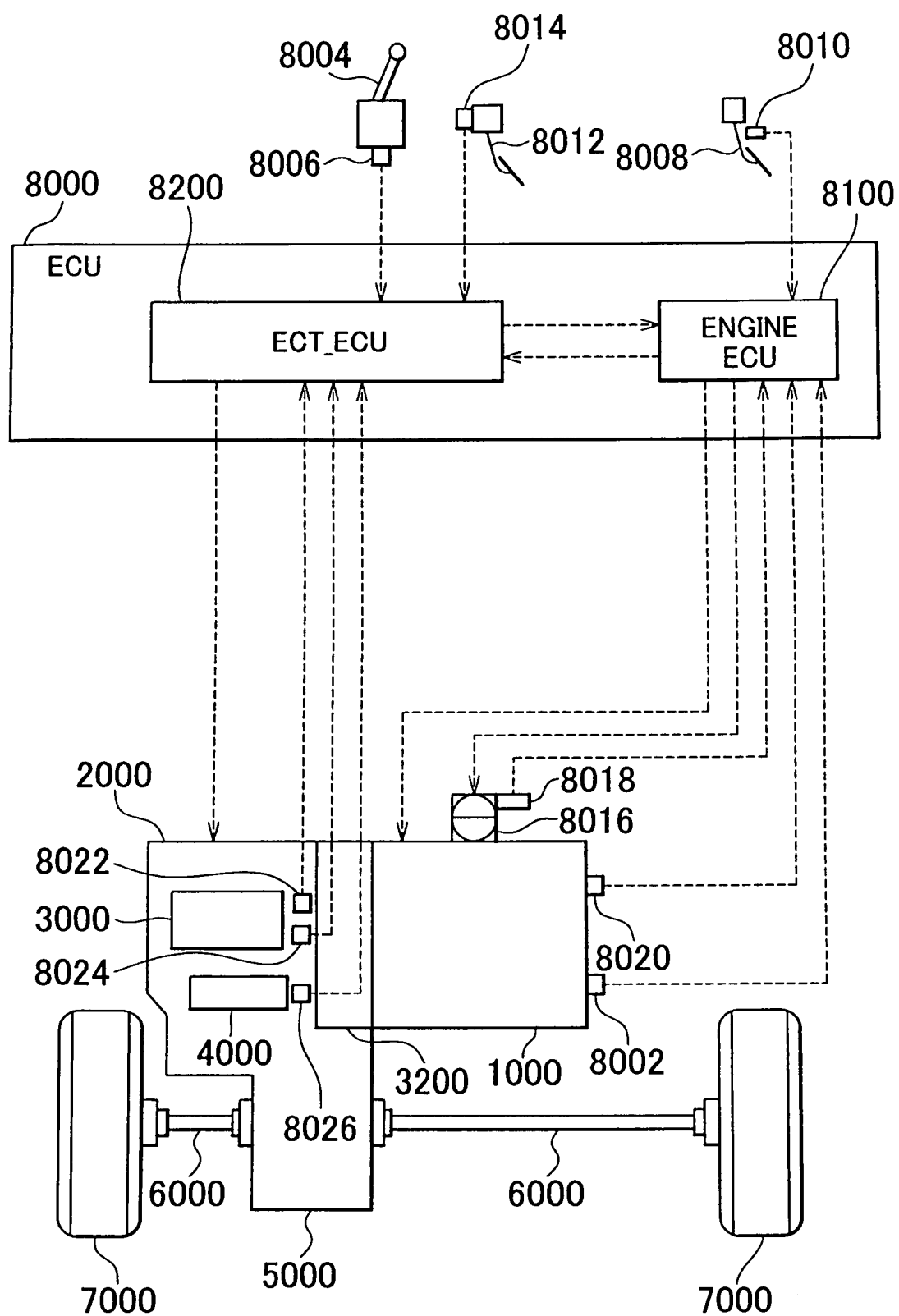
FIG. 1 is a schematic diagram showing the configuration of the power train of a vehicle.

Hereinafter, embodiments of the invention will be described with reference to the drawings. In the following description, the same and corresponding components are denoted by the same reference numerals, and have the same names and the same functions. Therefore, the detailed description thereof will not be repeated.

A vehicle provided with a control apparatus according to a first embodiment of the invention will be described with reference to FIG. 1. The vehicle is a front-engine front-drive vehicle. The control apparatus according to the invention may be provided in a vehicle other than the front-engine front-drive vehicle.

The vehicle includes an engine 1000, an automatic transmission 2000; a planetary gear unit 3000 that constitutes a part of the automatic transmission 2000; a hydraulic circuit 4000 that constitutes a part of the automatic transmission 2000; a differential gear 5000; a drive shaft 6000; front wheels 7000; and an ECU (Electronic Control Unit) 8000. The control apparatus according to the embodiment may be implemented, for example, by executing a program stored in the ROM (Read Only Memory) of the ECU 8000.

The engine 1000 is an internal combustion engine in which mixture of air and fuel injected from an injector (not shown) is burned in the combustion chamber of each cylinder. A piston is pushed down in the cylinder by combustion, and thus a crankshaft is rotated. Instead of, or in addition to the engine 1000, a motor may be employed as a power source.

The automatic transmission 2000 is connected to the engine 1000 via a torque converter 3200. When a desired gear is selected in the automatic transmission 2000, the rotational speed of the crankshaft input to the automatic transmission 2000 changes to the desired rotational speed.

The output gear of the automatic transmission 2000 engages with the differential gear 5000. The differential gear 5000 is connected to a drive shaft 6000, for example, using a spline. Power is transmitted to the front right and front left wheels 7000 via the drive shaft 6000.

The ECU 8000 is connected to a coolant-temperature sensor 8002, a position switch 8006 for a shift lever 8004, an accelerator-pedal operation amount sensor 8010 for an accelerator pedal 8008, a brake-pedal force sensor 8014 for a brake pedal 8012, a throttle-valve opening amount sensor 8018 for an electronic throttle valve 8016, an engine speed sensor 8020, an input-shaft rotational speed sensor 8022, an output-shaft rotational speed sensor 8024, and an oil-temperature sensor 8026, for example, via harness.

The coolant-temperature sensor 8002 detects the temperature of coolant for the engine 1000 (hereinafter, referred to as "coolant temperature"), and transmits a signal that indicates the detected coolant temperature to the ECU 8000. The position switch 8006 detects the position of the shift lever 8004, and transmits a signal that indicates the detected shift lever position to the ECU 8000. The gear is automatically selected in the automatic transmission 2000, according to the position of the shift lever 8004. A manual shift mode may also be selected. When the manual shift mode is selected, a driver may select any gear by manual operation.

The accelerator-pedal operation amount sensor 8010 detects the operation amount of the accelerator pedal 8008 (hereinafter, referred to as "accelerator-pedal operation amount"), and transmits a signal that indicates detected accelerator-pedal operation amount to the ECU 8000. The brake-pedal force sensor 8014 detects the force applied to the brake pedal 8012, and transmits a signal that indicates the detected force to the ECU 8000.

The throttle-valve opening amount sensor 8018 detects the opening amount of the electronic throttle valve 8016, and transmits a signal that indicates the detected opening amount to the ECU 8000. The opening amount of the electronic throttle valve 8016 is adjusted by an actuator. The electronic throttle valve 8016 adjusts the amount of air taken into the engine 1000 (i.e., output from the engine 1000).

The amount of air taken into the engine 1000 may be adjusted by adjusting the lifts of an intake valve (not shown) and an exhaust valve (not shown), or the rotational phases for opening/closing the intake valve and exhaust valve, instead of, or in addition to operating the electronic throttle valve 8016.

The engine speed sensor 8020 detects the rotational speed of the crankshaft of the engine 1000, and transmits a signal that indicates the detected crankshaft speed to the ECU 8000. The input-shaft rotational speed sensor 8022 detects the rotational speed NI of the input shaft of the automatic transmission 2000 (i.e., the rotational speed NT of the turbine of the torque converter 3200), and transmits a signal that indicates the detected input shaft speed to the ECU 8000. The output-shaft rotational speed sensor 8024 detects the rotational speed NO of the output shaft of the automatic transmission 2000, and transmits a signal that indicates the detected output shaft speed to the ECU 8000.

The oil-temperature sensor 8026 detects the temperature of automatic transmission fluid (ATF), used for operating and lubricating the automatic transmission 2000, and transmits the detected ATF temperature to the ECU 8000.

The ECU 8000 controls devices so that the vehicle moves in a desired state, based on the signals transmitted from the coolant-temperature sensor 8002, position switch 8006, accelerator-pedal operation amount sensor 8010, brake-pedal force sensor 8014, throttle-valve opening amount sensor 8018, engine speed sensor 8020, input-shaft rotational speed sensor 8022, output-shaft rotational speed sensor 8024, oil-temperature sensor 8026, and the like, and maps and programs stored in the ROM (Read Only Memory).

In this embodiment, when the shift lever 8004 is in D (Drive), and accordingly the D (Drive) range is selected in the automatic transmission 2000, the ECU 8000 controls the automatic transmission 2000 so that one of a first gear to a sixth gear is selected. When one of the first gear to the sixth gear is selected, the automatic transmission 2000 transmits driving force to the front wheels 7000. In the D range, at least one higher gear than the sixth gear may be provided. That is, for example, a seventh gear and an eighth gear may be provided. The gear is selected based on a shift diagram that is made in advance, for example, empirically. In the shift diagram, the vehicle speed and accelerator-pedal operation amount are used as parameters.

As shown in FIG. 1, the ECU 8000 includes an engine ECU 8100 that controls the engine 1000, and an ECT (Electronic Controlled Transmission)_ECU 8200 that controls the automatic transmission 2000.

The engine ECU 8100 transmits/receives signals to/from the ECT_ECU 8200. In this embodiment, the engine ECU 8100 transmits the signal that indicates the accelerator-pedal operation amount and the signal that indicates the temperature of coolant for the engine 1000 to the ECT_ECU 8200. The ECT_ECU 8200 transmits the signal that indicates a requested torque amount that is defined as "torque that needs to be output from the engine 1000" to the engine ECU 8100.

Figure 2:
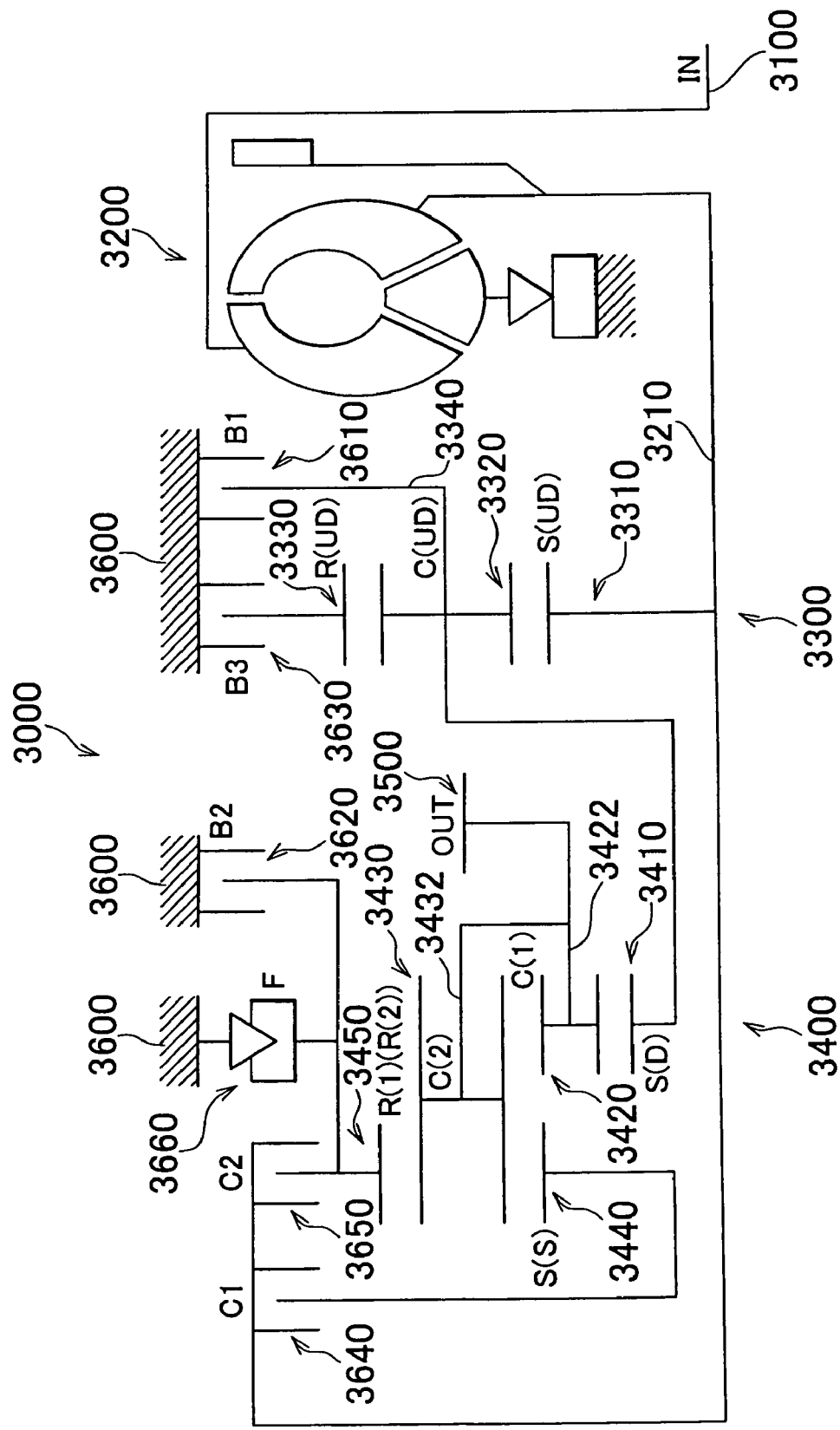
FIG. 2 is a skeleton diagram showing the planetary gear unit of an automatic transmission.

The planetary gear unit 3000 will be described with reference to FIG. 2. The planetary gear unit 3000 is connected to the torque converter 3200 that includes the input shaft 3100 connected to the crankshaft. The planetary gear unit 3000 includes a first planetary gear set 3300, a second planetary gear set 3400, an output gear 3500, a B1 brake 3610, a B2 brake 3620, and a B3 brake 3630, a C1 clutch 3640 and a C2 clutch 3650, and a one-way clutch F3660. The B1 brake 3610, B2 brake 3620, and B3 brake 3630 are fixed to the gear case 3600.

The first planetary gear set 3300 is a single pinion type planetary gear mechanism. The first planetary gear set 3300 includes a sun gear S (UD) 3310, a pinion 3320, a ring gear R (UD) 3330, and a carrier C (UD) 3340.

The sun gear S (UD) 3310 is connected to the output shaft 3210 of the torque converter 3200. The pinion 3320 is rotatably supported by the carrier C (UD) 3340. The pinion 3320 engages with the sun gear S (UD) 3310 and ring gear R (UD) 3330.

The ring gear R (UD) 3330 is fixed to the gear case 3600 by the B3 brake 3630. The carrier C (UD) 3340 is fixed to the gear case 3600 by the B1 brake 3610.

The second planetary gear set 3400 is a Ravigneaux type planetary gear mechanism. The second planetary gear set 3400 includes a sun gear S (D) 3410, a short pinion 3420, a carrier C(1) 3422, a long pinion 3430, a carrier C(2) 3432, a sun gear S (S) 3440, and a ring gear R(1) (R(2)) 3450.

The sun gear S (D) 3410 is connected to the carrier C (UD) 3340. The short pinion 3420 is rotatably supported by the carrier C(1) 3422. The short pinion 3420 engages with the sun gear S (D) 3410, and long pinion 3430. The carrier C(1) 3422 is connected to the output gear 3500.

The long pinion 3430 is rotatably supported by the carrier C(2) 3432. The long gear 3430 engages with the short pinion 3420, sun gear S (S) 3440, and ring gear R(1) (R(2)) 3450. The carrier C(2) 3432 is connected to the output gear 3500.

The sun gear S (S) 3440 is connected to the output shaft 3210 of the torque converter 3200 by the C1 clutch 3640. The ring gear R(1) (R(2)) 3450 is fixed to the gear case 3600 by the B2 brake 3620, and connected to the output shaft 3210 of the torque converter 3200 by the C2 clutch 3650. The ring gear R(1) (R(2)) 3450 is connected to the one-way clutch F3660. When the engine drives the wheels in the first gear, the ring gear R(1) (R(2)) 3450 is prevented from rotating.

The one-way clutch F3660 is provided in parallel with the B2 brake 3620. That is, the outer race of the one-way clutch F3660 is fixed to the gear case 3600. The inner race of the one-way clutch F3660 is connected to the ring gear R(1) (R(2)) 3450 via a rotation shaft.

FIG. 3 is an operation table that shows the relation between the gears and the operating states of the clutches and brakes. By operating the brakes and clutches as shown in the operation table, one of the first gear to the sixth gear, and a reverse gear is selected.

Figure 4:
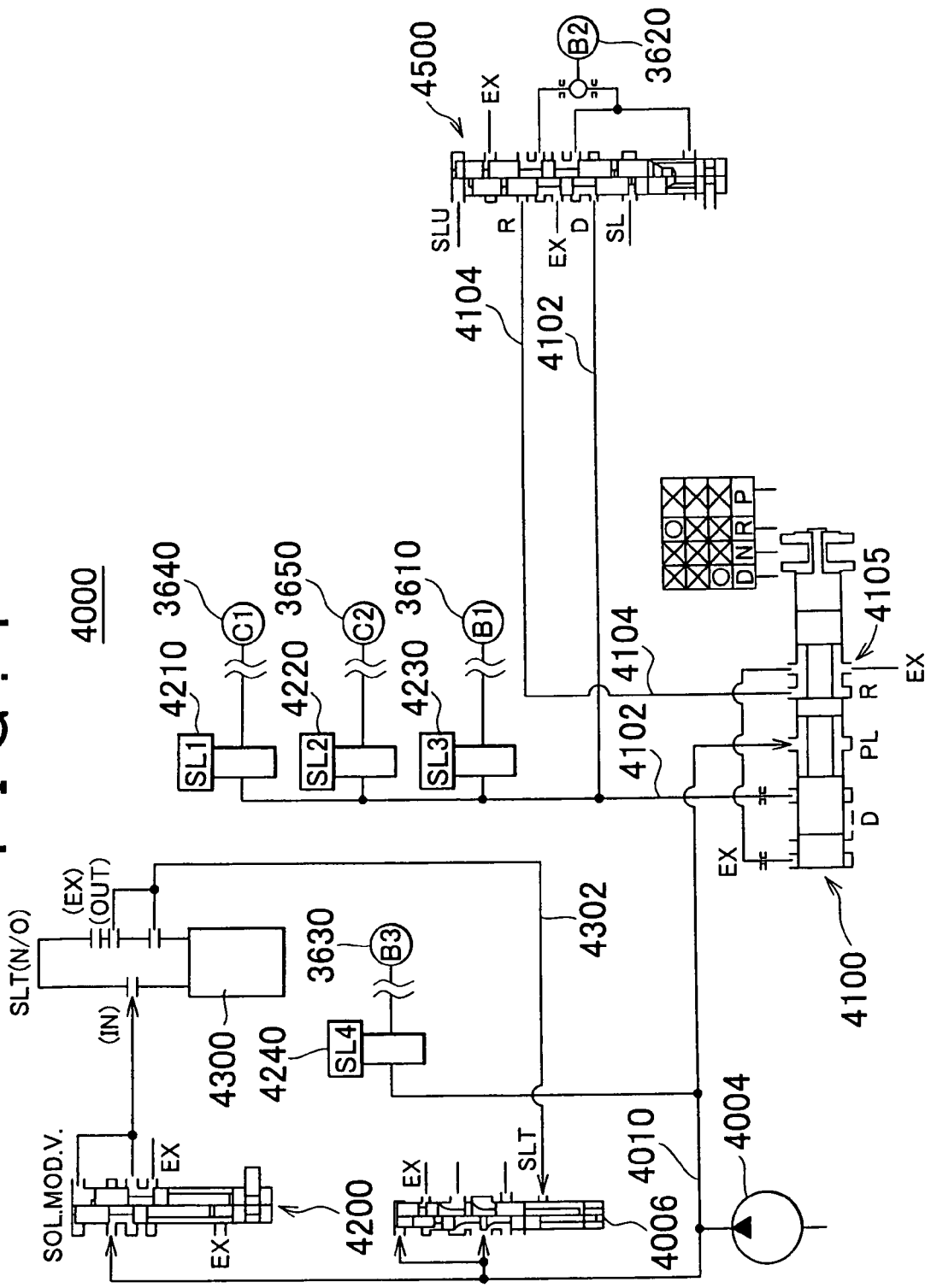
FIG. 4 is a diagram showing the hydraulic circuit of the automatic transmission.

As shown in FIG. 4, the main part of the hydraulic circuit 4000 will be described. The hydraulic circuit 4000 is not limited to the circuit described below.

The hydraulic circuit 4000 includes an oil pump 4004, a primary regulator valve 4006, a manual valve 4100, a solenoid modulator valve 4200, an SL1 linear solenoid (hereinafter, simply referred to as SL(1)) 4210, an SL2 linear solenoid (hereinafter, simply referred to as SL(2)) 4220, an SL3 linear solenoid (hereinafter, simply referred to as SL(3)) 4230, an SL4 linear solenoid (hereinafter, simply referred to as SL(4)) 4240, an SLT linear solenoid (hereinafter, simply referred to as SLT) 4300, and a B2 control valve 4500.

The oil pump 4004 is connected to the crankshaft of the engine 1000. By rotating the crankshaft, the oil pump 4004 generates a hydraulic pressure. The primary regulator valve 4006 regulates the hydraulic pressure generated by the oil pump 4004, which is the source pressure, to a line pressure.

The primary regulator valve 4006 is operated by a throttle pressure that functions as a pilot pressure. The SLT 4300 regulates a solenoid modulator pressure to the throttle pressure, as described later. The line pressure is supplied to the manual valve 4100 via a line pressure oil passage 4010.

The manual valve 4100 includes a drain port 4105. The hydraulic pressure in a D-range pressure oil passage 4102 and the hydraulic pressure in an R-range pressure oil passage 4104 are discharged through the drain port 4105. When the spool of the manual valve 4100 is at the position D, communication is provided between the line pressure oil passage 4010 and the D-range pressure oil passage 4102, and thus, the hydraulic pressure is supplied to the D-range pressure oil passage 4102. At this time, communication is provided between the R-range pressure oil passage 4104 and the drain port 4105, and thus, the R-range pressure in the R-range pressure oil passage 4104 is discharged through the drain port 4105.

When the spool of the manual valve 4100 is at position R, communication is provided between the line pressure oil passage 4010 and the R-range pressure oil passage 4104, and thus, the hydraulic pressure is supplied to the R-range pressure oil passage 4104. At this time, communication is provided between the D-range pressure oil passage 4102 and the drain port 4105, and thus, the D-range pressure in the D-range pressure oil passage 4102 is discharged through the drain port 4105.

When the spool of the manual valve 4100 is at the position N, communication is provided between the D-range pressure oil passage 4102 and the drain port 4105, and between the R-range pressure oil passage 4104 and the drain port 4105. Thus, the D-range pressure in the D-range pressure oil passage 4102 and the R-range pressure in the R-range pressure oil passage 4104 are discharged through the drain port 4105.

The hydraulic pressure supplied to the D-range pressure oil passage 4102 is finally supplied to the B1 brake 3610, B2 brake 3620, C1 clutch 3640, and C2 clutch 3650. The hydraulic pressure supplied to the R-range pressure oil passage 4104 is finally supplied to the B2 brake 3620.

The solenoid modulator valve 4200 regulates the line pressure, which is the source pressure, to the constant solenoid modulator pressure to be supplied to the SLT 4300.

The SL(1) 4210 regulates a hydraulic pressure to be supplied to the C1 clutch 3640. The SL(2) 4220 regulates a hydraulic pressure to be supplied to the C2 clutch 3650. The SL(3) 4230 regulates a hydraulic pressure to be supplied to the B1 brake 3610. The SL(4) 4240 regulates a hydraulic pressure to be supplied to the B3 brake 3630.

The SLT 4300 regulates the solenoid modulator pressure, which is the source pressure, to the throttle pressure according to a control signal from the ECU 8000. The ECU 8000 transmits the control signal based on the accelerator-pedal operation amount detected by the accelerator-pedal operation amount sensor 8010. The throttle pressure is supplied to the primary regulator valve 4006 via an SLT oil passage 4302. The throttle pressure is used as the pilot pressure for the primary regulator valve 4006.

The SL(1) 4210, SL(2) 4220, SL(3) 4230, SL(4) 4240, and SLT 4300 are controlled by the control signals transmitted from the ECU 8000.

The B2 control valve 4500 selectively supplies the hydraulic pressure in the D-range pressure oil passage 4102 or the hydraulic pressure in the R-range pressure oil passage 4104 to the B2 brake 3620. The B2 control valve 4500 is connected to the D-range pressure oil passage 4102 and the R-range pressure oil passage 4104. The B2 control valve 4500 is controlled by the hydraulic pressure supplied from an SL solenoid valve (not shown) and the hydraulic pressure supplied from an SLU solenoid valve (not shown), and the impelling force of a spring.

When the SL solenoid valve is off, and the SLU solenoid valve is on, the B2 control valve 4500 is in the state as shown in the left half of the B2 control valve 4500 in FIG. 4. In this case, the B2 control valve 4500 is operated by the hydraulic pressure supplied from the SLU solenoid valve, which functions as the pilot pressure. Thus, the B2 control valve 4500 regulates the D-range pressure, and supplies the regulated D-range pressure to the B2 brake 3620.

When the SL solenoid valve is on, and the SLU solenoid valve is off, the B2 control valve 4500 is in the state as shown in the right half of the B2 control valve 4500 in FIG. 4. In this case, the B2 control valve 4500 supplies the R-range pressure to the B2 brake 3620.

Figure 5:
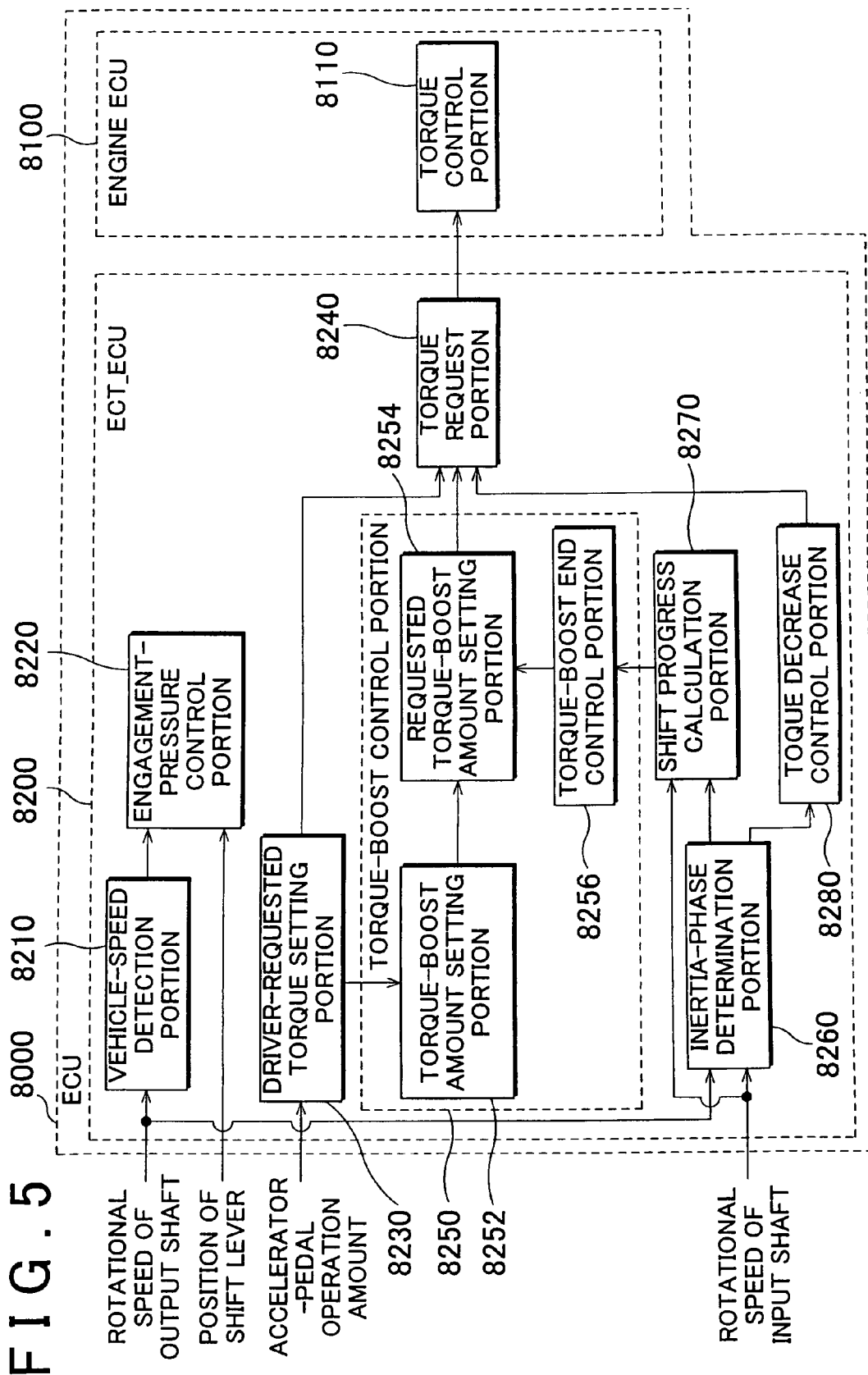
FIG. 5 is a function block diagram showing an ECU according to an embodiment of the invention.

The ECU 8000 will be further described with reference to FIG. 5. The function of the ECU 8000 described below may be implemented through hardware or software.

The engine ECU 8100 of the ECU 8000 includes a torque control portion 8110. The torque control portion 8110 receives the signal that indicates the requested torque amount from the ECT_ECU 8200. Then, the torque control portion 8110 controls the opening amount of the electronic throttle valve 8016 and the timing at which an ignition plug ignites air-fuel mixture so that the actual torque output from the engine 1000 is equal to the requested torque amount.

The ECT_ECU 8200 of the ECU 8000 includes a vehicle-speed detection portion 8210, an engagement-pressure control portion 8220, a driver-requested torque setting portion 8230, a torque request portion 8240, a torque-boost control portion 8250, an inertia-phase determination portion 8260, a shift progress calculation portion 8270, and a torque decrease control portion 8280.

The vehicle-speed detection portion 8210 calculates (detects) the vehicle speed based on the rotational speed NO of the output shaft of the automatic transmission 2000. The engagement-pressure control portion 8220 controls the engagement pressures for the B1 brake 3610, B2 brake 3620, B13 brake 3630, C1 clutch 3640, and C2 clutch 3650 during the gear shift, and after the gear shift ends.

The driver-requested torque setting portion 8230 sets a driver-requested torque based on the accelerator-pedal operation amount, and the like. The driver-requested torque is the torque requested by the driver. As the accelerator-pedal operation amount increases, the driver-requested torque increases.

The torque request portion 8240 sets the requested torque amount based on the driver-requested torque, and the like. The requested torque amount is the torque required of the engine 1000. For example, when the automatic transmission 2000 is not shifting, and accordingly the vehicle is steadily moving, the requested torque amount is set to the driver-requested torque.

The torque-boost control portion 8250 executes the torque-boost control to boost the torque during the torque phase when the automatic transmission 2000 upshifts. The torque-boost control portion 8250 includes a torque-boost amount setting portion 8252, a requested torque-boost amount setting portion 8254, and a torque-boost end control portion 8256.

The torque-boost amount setting portion 8252 sets a torque-boost amount, which is the amount by which the torque output from the engine 1000 needs to be boosted, of the torque-boost control. The torque-boost amount is set based on the driver-requested torque, that is, the accelerator-pedal operation amount.

The requested torque-boost amount setting portion 8254 sets a requested torque-boost amount to increase the torque output from the engine 1000 by the torque-boost amount in a predetermined manner during the torque phase when the automatic transmission 2000 upshifts. That is, the requested torque-boost amount increases in the predetermined manner during the torque phase, and finally reaches the torque-boost amount.

When the torque-boost control is executed, the torque request portion 8240 sets the requested torque amount to the sum of the requested torque-boost amount and the driver-requested torque. When the torque-boost control is executed, the throttle-valve opening amount THA is corrected to be larger than that when the requested torque amount is set to the driver-requested torque. The torque-boost end control portion 8256 of the torque-boost control portion 8250 will be described later.

The inertia-phase determination portion 8260 determines whether the inertia phase has started, based on the rotational speed NI of the input shaft of the automatic transmission 2000 (i.e., the rotational speed NT of the turbine of the torque converter 3200) and the rotational speed NO of the output shaft of the automatic transmission 2000. The inertia-phase determination portion 8260 determines that the inertia phase has started, when the rotational speed NI of the input shaft of the automatic transmission 2000 is lower than a value obtained by multiplying the rotational speed NO of the output shaft of the automatic transmission 2000 by the gear ratio of the gear selected before the gear shift (upshift) starts. The method of determining whether the inertia phase has started is not limited to this method.

The shift progress calculation portion 8270 calculates a shift progress degree S, which is the current degree of progress of a gear shift operation during a period from the start of the inertia phase until the completion of gear shift operation. The shift progress degree S is calculated using the equation (1) described below. In this equation (1), NI (S) represents the rotational speed NI of the input shaft at the start of the inertia phase; NI (E) represents the estimated rotational speed NI of the input shaft at the completion of gear shift operation, that is, at the end of the inertia phase; and K is a predetermined correction value.

$$S=(NI(S)-NI)/(NI(S)-(NI(E)+K)) \qquad (1)$$

The estimated rotational speed NI (E) of the input shaft at the completion of gear shift operation is calculated by multiplying the rotational speed NO of the output shaft at the start of the inertia phase, by the gear ratio of the gear selected after the gear shift ends. Thus, it is possible to accurately calculate the shift progress degree based on the actual state of the automatic transmission. The method of calculating the estimated rotational speed NI (E) of the input shaft at the completion of shift operation is not limited to this method.

When it is determined that the inertia phase has started, the torque-boost end control portion 8256 of the torque-boost control portion 8250 of the ECT_ECU 8200 executes a torque-boost end control that gradually decrease the throttle-valve opening amount THA. The throttle-valve opening amount THA during the torque-boost end control is calculated using the equation (2) described below. In the equation (2), THA (D) represents the throttle-valve opening amount THA when the requested torque amount is set to the driver-requested torque, that is, when the torque-boost control is not executed; and ΔTHA represents a correction amount by which the throttle-valve opening amount THA is increased by the torque-boost control.

$$THA = THA(D) + (1-S) \times \Delta THA \quad (2)$$

By calculating the throttle-valve opening amount THA using this equation (2), a correction amount ((1−S)×ΔTHA), by which the throttle-valve opening amount THA is corrected, is gradually decreased so that the correction amount is "0" at the time point when the shift progress degree S is "1". In this embodiment, the gear shift operation is completed at the time point when the shift progress degree S is "1".

The torque decrease control portion 8280 executes a torque decrease control that decreases the torque during the inertia phase when the automatic transmission 2000 upshifts. During the torque decrease control, the torque decrease control portion 8280 sets a requested torque to gradually decrease the torque to a predetermined value lower than the driver-requested torque (at a predetermined rate of change) after the inertia phase starts. During the torque decrease control, the torque request portion 8240 sets the requested torque amount to the requested torque set by the torque decrease control portion 8280.

The torque request portion 8240 sets a retard amount by which the ignition timing is retarded, taking into account that the throttle-valve opening amount THA is gradually decreased by the above-described torque-boost end control, and accordingly the torque is decreased. Thus, the torque request portion 8240 decreases the torque output from the engine 1000 to the requested torque set by the torque decrease control portion 8280 of the ECT_ECU 8200.

Figure 6:
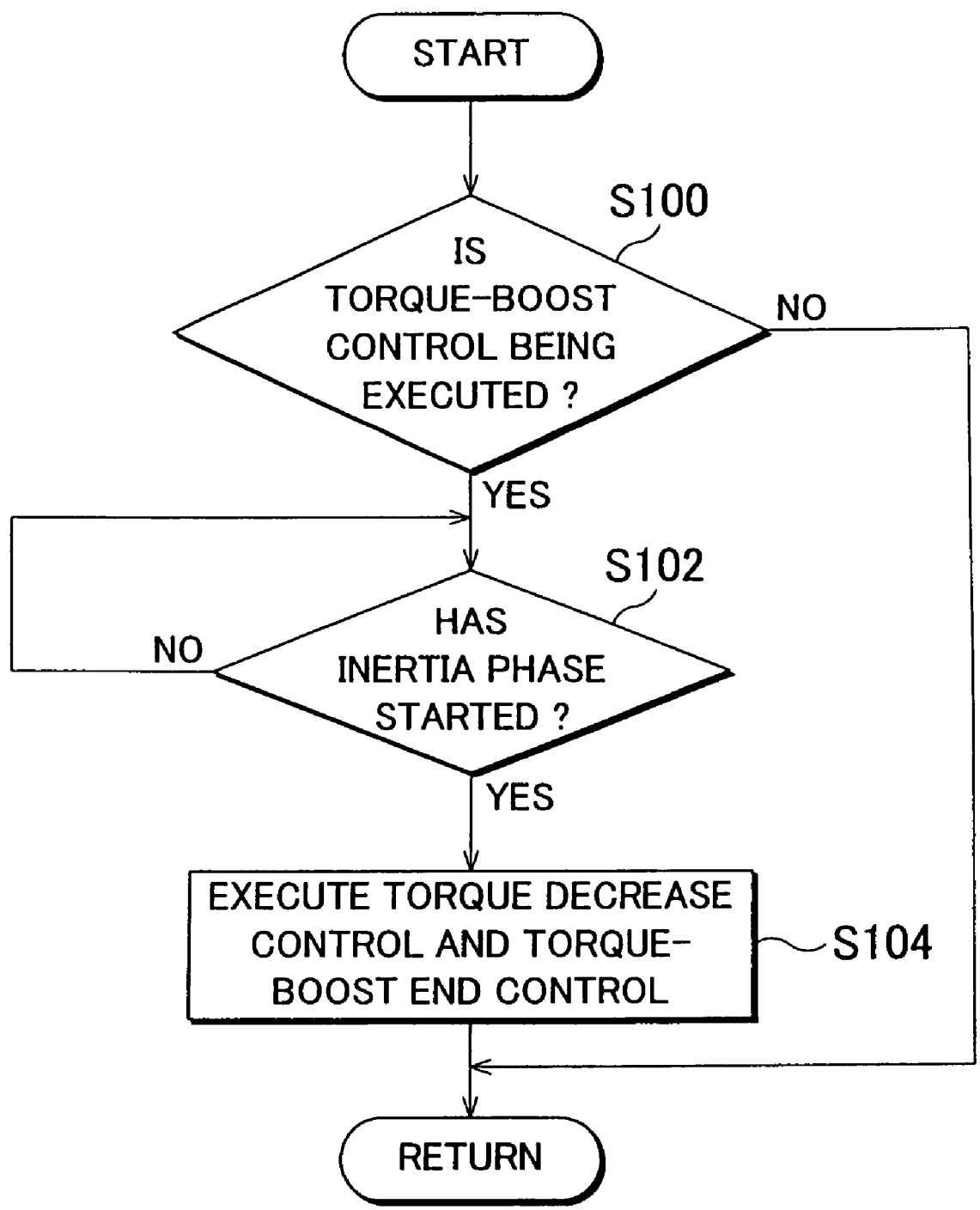
FIG. 6 is a diagram showing a routine executed by the ECU according to the embodiment of the invention.

The routine executed by the ECU 8000 when the automatic transmission 2000 upshifts will be described with reference to FIG. 6. The ECU 8000 is the control apparatus according to the embodiment.

In step S100, the ECU 8000 determines whether the torque-boost control during the torque phase is being executed. When the torque-boost control is being executed (YES in step S100), the routine proceeds to step S102. When the torque-boost control is not being executed (NO in step S100), the routine ends.

In step S102, the ECU 8000 determines whether the inertia phase has started. When the inertia phase has started (YES in step S102), the routine proceeds to step S104. When the inertia phase has not started (NO in step S102), the routine returns to step S102.

In step S104, the ECU 8000 executes the torque decrease control and the torque-boost end control for decreasing the throttle-valve opening amount during the inertia phase.

The operation of the ECU 8000 based on the above-described structure and flowchart will be described. The ECU 8000 is the control apparatus according to the embodiment.

When the automatic transmission 2000 upshifts, it is determined whether the torque-boost control during the torque phase is being executed (S100). When the torque-boost control is being executed (YES in step S100), the requested torque amount is finally set to a value that is larger than the driver-requested torque, as shown in FIG. 7.

To output the torque that is equal to the requested torque amount, the throttle-valve opening amount THA is corrected to be larger than the throttle-valve opening amount THA (D) that is the throttle-valve opening amount when the requested torque amount is set to the drive-requested torque.

When the inertia phase has started (YES in step S102), the torque decrease control during the inertia phase and the torque-boost end control for decreasing the throttle-valve opening amount are executed (S104).

The requested torque amount is set to gradually decrease the torque to a value lower than the driver-requested torque, as shown in FIG. 7. The engine 1000 is controlled to output the torque that is equal to the requested torque amount.

When the torque output from the engine 1000 is changed, an advance amount by which the ignition timing is advanced, and the retard amount by which the ignition timing is retarded, are limited to ensure emission performance. Therefore, it is difficult to decrease the torque by changing only the ignition timing, without changing the throttle-valve opening amount THA.

Accordingly, when the torque decrease control is executed, the throttle-valve opening amount THA is gradually decreased by the torque-boost end control until time point T(1) at which the shift progress degree is "1", as shown in FIG. 7. Thus, it is possible to reduce the possibility that the torque output from the engine 1000 is sharply decreased when the torque is decreased during the torque phase.

As described above, when the inertia phase starts, the ECU, which is the control apparatus according to the embodiment, gradually decreases the throttle-valve opening amount THA, which has been increased during the torque phase, so that the correction amount is decreased to "0". The correction amount is the amount by which the throttle-valve opening amount THA is corrected. Thus, the torque output from the engine is gradually decreased. Accordingly, it is possible to reduce the possibility that the torque output from the engine is sharply decreased during the inertia phase. As a result, it is possible to reduce the possibility that a driver feels that the vehicle is decelerated during the inertia phase.

Also, it is possible to gradually decrease a correction amount by which the operation amount of an adjustment mechanism that adjusts an amount of air taken into the engine is corrected, as the gear shift operation proceeds. Accordingly, it is possible to reduce the possibility that the correction amount becomes "0" earlier than necessary when a time required to complete the gear shift operation is long, or the correction amount becomes "0" late when the time required to complete the gear shift operation is short.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

What is claimed is:

1. A control apparatus for a vehicle that includes an engine, and an automatic transmission, connected to the engine, in which a gear is selected from among a plurality of gears with different gear ratios by selectively engaging a plurality of friction engagement elements, comprising:

a torque-boost control portion that boosts torque output from the engine, and corrects an opening amount of a throttle valve that adjusts an amount of air taken into the engine to increase the amount of air during a torque phase when the automatic transmission upshifts; and an inertia-phase determination portion configured to determine whether an inertia phase has started, when a rotational speed of an input shaft of the automatic transmission is lower than a value obtained by multiplying a rotational speed of an output shaft of the automatic transmission by the gear ratio of the gear selected before an upshift starts, wherein the torque-boost control portion includes a torque-boost end control portion that executes a torque-boost end control that gradually decreases a correction amount, by which the opening amount of the throttle valve is corrected, to zero when the inertia-phase determination portion determines that the inertia phase has started, and the torque-boost end control portion calculates the opening amount of the throttle valve, using an equation, $THA = THA(D) + (1-S) \times \Delta THA$ where THA represents the opening amount of the throttle valve during the torque-boost end control, THA (D) represents the opening amount of the throttle valve when no control is executed by the torque-boost control portion, $\Delta THA$ represents a correction amount by which the opening amount of the throttle valve is increased by the torque-boost control portion, and S represents the shift progress degree.

2. The control apparatus for the vehicle according to claim 1, further comprising a calculation portion that calculates a shift progress degree that is a current degree of progress of a gear shift operation during a period from a start of the inertia phase until a completion of gear shift operation, wherein the torque-boost end control portion gradually decreases the correction amount by which the opening amount of the throttle valve is corrected, based on the shift progress degree so that the correction amount is decreased as the shift progress degree increases.

3. The control apparatus for the vehicle according to claim 2, wherein the torque-boost end control portion gradually decreases the correction amount so that the correction amount is zero when the shift progress degree indicates that the gear shift operation is completed.

4. The control apparatus for the vehicle according to claim 2, wherein the calculation portion calculates the shift progress degree based on a rotational speed of an input shaft of the automatic transmission.

5. The control apparatus for the vehicle according to claim 4, wherein the calculation portion calculates the shift progress degree using an equation, $S = (NI(S) - NI)/(NI(S) - (NI(E) + K))$, where S represents the shift progress degree, NI (S) represents the rotational speed of the input shaft at the start of the inertia phase, NI (E) represents the estimated rotational speed of the input shaft at the completion of the gear shift operation, NI represents the rotational speed of the input shaft, and K represents a predetermined correction value.

6. A method of controlling a vehicle that includes an engine, and an automatic transmission, connected to the engine, in which a gear is selected from among a plurality of gears with different gear ratios by selectively engaging a plurality of friction engagement elements, comprising:

boosting torque output from the engine, and correcting an opening amount of a throttle valve that adjusts an amount of air taken into the engine to increase the amount of air during a torque phase when the automatic transmission upshifts;

determining whether an inertia phase has started when a rotational speed of an input shaft of the automatic transmission is lower than a value obtained by multiplying a rotational speed of an output shaft of the automatic transmission by the gear ratio of the gear selected before an upshift starts; and gradually decreasing a correction amount, by which the opening amount of the throttle valve is corrected, to zero when it is determined that the inertia phase has started, wherein the opening amount of the throttle valve is calculated by a torque boost end control portion, using an equation, $THA = THA(D) + (1-S) \times \Delta THA$ where THA represents the opening amount of the throttle valve during a torque-boost end control, THA (D) represents the opening amount of the throttle valve when no control is executed by a torque-boost control portion, $\Delta THA$ represents a correction amount by which the opening amount of the throttle valve is increased by the torque-boost control portion, and S represents the shift progress degree.

* * * * *